Nov. 4, 1947.              C. HENDRICKS              2,430,397
                         ROLLER BEARING CAGE
                         Filed May 19, 1945
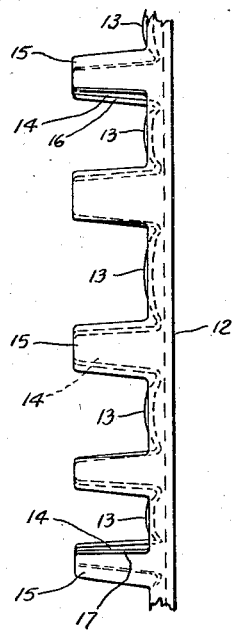
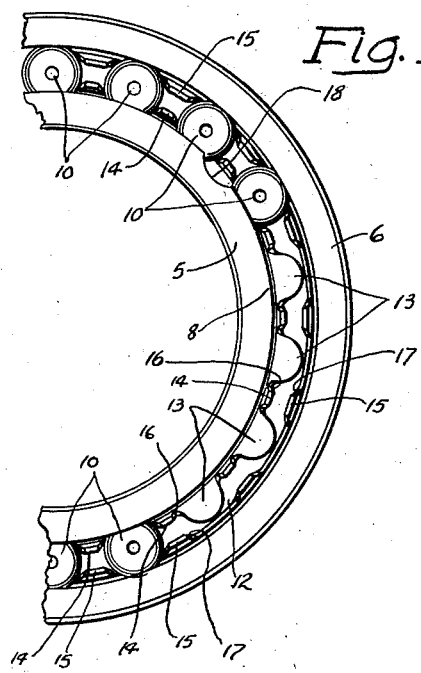
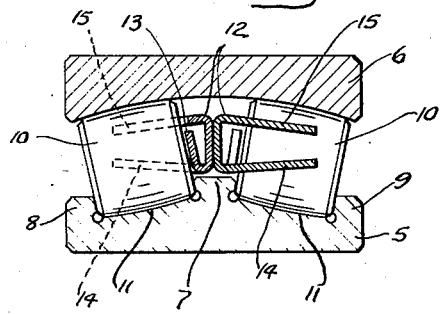
INVENTOR.
CORNELIUS HENDRICKS.
BY
Attorney Patented Nov. 4, 1947

2,430,397

UNITED STATES PATENT OFFICE 2,430,397

ROLLER BEARING CAGE

Cornelius Hendricks, Grand Rapids, Mich., assignor to The Torrington Company, Inc., South Bend, Ind., a corporation of Indiana Application May 19, 1945, Serial No. 594,703

13 Claims. (Cl. 308—217)

This invention relates to roller bearing assemblies, and more particularly is directed to the provision of an improved type of roll separator or cage member for use in such an assembly.

While the invention has been illustrated as applied to a double roll bearing assembly of the spherical type, it is to be understood that it can be applied to other types of roll bearing assemblies such as cylindrical roller bearing assemblies, either single or double.

One of the primary objects of the present invention is to provide a unitary one-piece stamping formed to provide a roll separator having roll receiving pockets defined by circumferentially spaced series of inner and outer fingers which define the roll receiving pockets, the inner ends of these pockets being provided with a pad adapted to bear against inner end of the rollers and also formed integrally with the separators.

Still another object is to provide such a separator which can be made very economically from sheet metal or the like and which can be accurately formed by a series of stamping operations, thereby rendering its formation susceptible to high speed volume production at low cost.

Another feature of the present invention is to provide a construction wherein the separator fingers have their lateral edges tapered to conform to the surface of the rolls so as to provide a minimum amount of friction while insuring proper separation of the rolls and maintaining the rolls in definite predetermined relationship within the bearing construction. The provision of the integrally formed tab or pad at the inner end of each of the roll receiving pockets is for the purpose of controlling any possible lateral shifting of the cage, and at the same time presenting a smooth surface of appreciable area to minimize the possibility of wear.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is an elevational view of a portion of a roller bearing assembly incorporating the present invention, certain of the rollers being eliminated to illustrate details of the roll separator construction;

Figure 2 is a sectional view through the bearing shown in Figure 1, illustrating the manner in which the rolls are retained in their respective pockets; and Figure 3 is a top plan view of a portion of the separator member, showing other details of its construction.

Considering now the drawing in detail, there is provided a roller bearing assembly comprising an inner race 5 and an outer race 6. It will be noted that the outer race 6 has an internal spherical bearing surface, and that the inner race 5 is provided at its center with a radially extended rib or flange 7 forming a separator for the two rolls, and is provided with end flanges 8 and 9, thereby defining separate curved raceways 11 for each row of rollers.

The rollers are shown at 10 and comprise barrel-shaped roll members, the rollers being adapted to be inclined in opposite directions.

Interposed between the respective series of rollers are roller separator members 12 preferably formed of a sheet metal stamping or the like, the members 12 having an annular radially extending connecting web portion which is provided with the inclined pad portions 13 shown in detail in Figures 1 and 3. The pads 13, as shown in Figure 2, are inclined slightly with respect to the web portion of the separators so that they lie in a plane substantially at right angles to the axis of the rollers 10. These pads are positioned adjacent the inner end surfaces of the respective series of rollers 10 and limit axial movement of the separator, thereby assisting in maintaining the rollers in substantial alinement within the bearing.

The roll receiving pockets are defined by a circumferentially spaced series of laterally extending inner and outer finger members 14 and 15, respectively. The inner series of finger members 14 are of less width than the outer members 15 in each set. Both sets, however, are tapered outwardly away from the web portion of the separator and are provided with beveled lateral edges 16 and 17 conforming in general to the peripheral surface of the rollers which are received within the pockets defined by the successive sets of fingers. It will be apparent that the entire separator assembly can be formed by suitable stamping operations from a flat piece of metal, the finger members being bent to extend laterally from the interconnecting web portion, and the intermediate pad sections 13 being then bent upwardly at a slight angle to the interconnecting web portions of the separators to form the end pads in each of the pockets. With this assembly it will be apparent that the rolls are individually confined within the successive roll pockets formed by the adjacent sets of fingers and the end pads 13, and thus will be maintained in spaced relation within the bearing assembly.

In assembling the rollers into the construction, the separators are first placed in position and the rolls are then inserted axially through the notched roll slot 18 shown in Figure 1, being successively forced axially inwardly into the respective pockets and the separator then rotated to bring the next succeeding pocket into alinement with the notch 18 to receive the next roll member.

It is to be understood that this type of separator can be readily used in connection with a two-row cylindrical roller bearing assembly in which case the pad angle would be revised to lie normal to the axis of the cylindrical rollers, and the fingers would extend normal to the web member.

It is, therefore, believed apparent that I have provided a novel type of roll separator for bearing assemblies of this type. I am aware that various slight modifications may be made in the dimensions and configuration of the roll pockets and I, therefore, do not intend to be limited except as defined by the scope and spirit of the appended claims.

I claim:

1. The combination, in a double row roller bearing assembly, of a roll separator for each row of rollers in said assembly comprising a one-piece stamping having an annular radial extending connecting web at the inner end of said row of rollers, a series of circumferentially spaced sets of fingers extending laterally from said web and tapering from said web outwardly, each set of fingers being radially spaced and having their edges oppositely tapered to define between successive sets of fingers roll-receiving pockets, and integral tab portions extending from said web between each set of fingers and inclined to lie in a plane at right angles to the axis of said rollers forming pads for the inner ends of said rollers.

2. In a roller bearing assembly, a roll separator for one row of rollers comprising a one-piece stamping having an annular radially extending connecting web, integral sets of laterally extending fingers projecting from said web in radially spaced relation and spaced circumferentially to define roll-receiving pockets between adjacent sets, and integral inclined pad portions connected to said web at the inner ends of each of said pockets intermediate said sets of fingers for limiting axial shifting of said rollers of said row.

3. A roll separator for one row of a double row roller bearing assembly comprising a one-piece stamping having an annular radially directed main body portion, circumferentially spaced sets of fingers directed laterally from said body portion at the inner and outer edges thereof and defining roll-receiving pockets between adjacent sets, and integral pad-like tabs formed on said body portion intermediate each set of fingers at the inner ends of said pockets and adapted to contact the inner end faces of the bearing rollers of said row.

4. The separator of claim 3 wherein the side edges of said fingers are beveled to conform generally to the peripheral surface of the rollers to be disposed in said pockets.

5. The separator of claim 3 wherein said fingers are gradually tapered toward the outer ends thereof and the inner finger is of appreciably less cross sectional area than the associated radial outer finger.

6. The separator of claim 3 wherein said tabs are inclined to the plane of said body portion and are bent up from the inner defining edge of said portion.

7. The separator of claim 3 wherein said tabs are inclined to the plane of said body portion and are bent up from a defining edge of said portion.

8. The combination, in a double spherical bearing including inner and outer races and having two circumferential series of barrel-shaped rollers between said races, said inner race having a central radial flange separating said rollers axially of independent roll separators for each series of rollers, each separator comprising a one piece stamping having a web-like annular body portion closely encircling said flange and having integral circumferentially spaced sets of inner and outer fingers extending axially between said rollers to define pockets for confining said rollers in predetermined spaced relation, said web-like portions abutting in back to back relation in the substantially radial plane of said flange.

9. The combination of claim 8 including integral tabs on said body portion of each separator intermediate successive sets of fingers forming end pads for said rollers at the inner ends of each of said pockets.

10. The combination, with a double row spherical roller bearing assembly having a radial flange separating said rows, of a separator cage for each row of rollers, each of said cages comprising a web-like radial body portion having circumferentially spaced pairs of fingers defining roller-receiving pockets, said web-like portion having an integral projection extending axially toward the adjacent end face of said rollers intermediate said fingers.

11. The combination of claim 10 wherein said separator cages have the web-like portions thereof in substantially axial abutting back to back engagement in the radial plane of said flange.

12. A separator cage for one row of a double row spherical roller bearing assembly, comprising a web-like radially disposed body portion disposed in the central vertical plane through said assembly, integral vertically spaced pairs of finger members circumferentially spaced about said body portion and defining between adjacent pairs roller-receiving pockets, said fingers of each pair tending to converge toward their free ends, and the radial outer finger of each pair being of greater width.

13. The cage of claim 12 having an integral portion projecting into the roller-receiving pocket intermediate each of said pairs of fingers and forming a pad surface adapted to be contacted by the central portion of the inner end face of the roller disposed in said pocket.

CORNELIUS HENDRICKS.

REFERENCES CITED

The following references are of record in the file of this patent:

UNITED STATES PATENTS

| Number | Name | Date |
|---|---|---|
| 1,616,827 | Runge | Feb. 8, 1927 |
| 2,034,566 | Fernstrom | Mar. 17, 1936 |
| 1,585,690 | Pratt | May 25, 1926 |
| 1,328,179 | Meier | Jan. 13, 1920 |
| 1,022,163 | Upton | Apr. 2, 1912 |
| 2,375,145 | Styri | May 1, 1945 |

FOREIGN PATENTS

| Number | Country | Date |
|---|---|---|
| 47,264 | Sweden | Mar. 22, 1919 |
| 53,485 | Sweden | Apr. 1, 1920 |